(12) United States Patent
Sakcriska (10) Patent No.: US 6,443,819 B2
(45) Date of Patent: Sep. 3, 2002

(54) DEVICE FOR DRESSING GRINDING WHEELS

(76) Inventor: Glenn Sakcriska, 108 Maple St., Ypsilanti, MI (US) 48198

(*) Notice: Subject to any disclaimer, the term of this patent is extended or adjusted under 35 U.S.C. 154(b) by 0 days.

(21) Appl. No.: 09/861,823

(22) Filed: May 21, 2001

Related U.S. Application Data (63) Continuation-in-part of application No. 08/991,473, filed on Dec. 16, 1997, now abandoned.

(51) Int. Cl.⁷ .................................................. B24B 7/00
(52) U.S. Cl. ........................ 451/234; 451/231; 451/541; 451/443
(58) Field of Search ........................ 451/56, 443, 548, 451/549, 541, 545, 231, 234

(56) References Cited

U.S. PATENT DOCUMENTS

| | | | | |
|---|---|---|---|---|
| 1,688,468 A | * | 10/1928 | Maynard | 451/443 |
| 3,143,106 A | * | 8/1964 | Zwick | 451/443 |
| 5,172,681 A | * | 12/1992 | Ruark et al. | 451/443 |
| 5,848,323 A | * | 1/1996 | Smith | 451/56 |
| 5,618,221 A | * | 4/1997 | Furukawa et al. | 451/443 |
| 5,632,666 A | * | 5/1997 | Peratello et al. | 451/443 |
| 5,660,579 A | * | 8/1997 | Nakayama et al. | 451/443 |

* cited by examiner

*Primary Examiner*—Eileen P. Morgan
(74) *Attorney, Agent, or Firm*—Barbara M. Burns (57) ABSTRACT

A movable frame assembly to move a device for dressing a grinding wheel for the sharpening an ice skate blade. The device uses a housing surrounding a grinding wheel and movable frame with a swing arm. A dressing tool is mounted in the dresser swing arm and the dresser swing arm is rotatable between a storage position and an operating position. The movable frame assembly slides along rails to allow positioning of the dressing tool into the grinding wheel. Horizontally and vertically disposed bearings are positioned beside and under a rail with resiliently biased bearings are held against the top of the rail. The bearings help the rails of the movable frame move smoothly. The rails are spaced apart by yokes on the arm or a bar across the top of the dresser to prevent binding as the movable frame is slid for dressing the wheel. Adjustment of the rails is also provided for by adjustment slots at the back of the rails.

12 Claims, 6 Drawing Sheets

DEVICE FOR DRESSING GRINDING WHEELS

CROSS-REFERENCE TO RELATED APPLICATION

This application is a Continuation-In-Part application based on Ser. No. 08/991,473 filed Dec. 16, 1997, now abandoned.

BACKGROUND OF THE INVENTION

The field of the invention pertains to grinding wheels. In particular, the invention pertains to a device for dressing or shaping the grinding wheel for sharpening and imparting a certain shape to the blade of an ice skate. In the past, dressing the wheel was inexact and hence the shape given to an ice skate blade was variable. The dressing devices were not stabilized enough to keep the dressing tool in a consistent relation with the grinding wheel. Another disadvantage was that the placement of the dressing tool to the grinding wheel was difficult as the dressing tool was not easily movable.

By dressing the grinding wheel, a certain shape is imparted to the wheel, which shape then is imparted to the ice skate blade as the blade is sharpened by the wheel. Skates for certain purposes require certain shapes. A hockey player needs a hollow or a radius to be ground on the blade of the ice skate. The hollow grind creates two edges on the outside of the blade by lowering the center portion beneath the edges. A goalie on the other hand needs an almost flat blade with minimum of hollow provided to the skate. As skates are ground, the grinding wheel loses its shape, necessitating dressing of the wheel. Or when a different shape is needed, the grinding wheel must be dressed to the desired shape for the wheel to be able to impart the desired shape to the ice skate blade.

It is important the deepest part of the hollow be centered on the ice skate blade. If the deepest part of the hollow is too far to one side of the blade, the skater will be forced off balance thus affecting the skater's performance.

SUMMARY OF THE INVENTION

A grinding wheel is partially contained within a housing that has a top cover or plate, a bottom, a back and sides. The invention includes a slide mechanism or rail assembly to move a dresser arm with dresser tool into and away from a grinding wheel. The grinding wheel is rotated horizontally for grinding, in this case, an ice skate blade. The dresser arm is moved in a horizontal direction along a rail assembly having a rail on each side of the housing.

The dresser arm is attached to ends of two rails and the dresser arm pivots around the attachment point of the rails. The dresser arm is slid via movable frame assembly/rails to place the dresser arm/dresser tool near the circumferential edge of the grinding wheel for the dressing operation.

The dresser arm with tool is moved in an arc for the dressing of the grinding wheel. The dresser arm is moved into engagement with the grinding wheel by pulling or pushing the dresser to move along the rails of the movable frame assembly. The movable frame assembly uses a rail on either side of the housing and a cross bar at the back of the housing. As discussed above, the dresser arm connects between the ends of the rails.

The movable frame assembly is positioned along the sides of a housing that partially encases the grinding wheel; leaving a portion of the wheel exposed. The exposed portion of the wheel is the location at which grinding occurs and the exposed portion of the wheel is also the location where dressing of the wheel occurs.

The movable frame assembly generally has two rails, one on each side of the housing. The rails are connected at the front by the dresser arm and at the back by a crossbar.

Bearings support the rails and the bearings being of a lubricating material, lubricate the movement of the rails. Both fixed and resilient bearings are used herein. Fixed bearings are disposed in a horizontal orientation and a vertical orientation. Fixed horizontal bearings are under each of the rails. The horizontal bearings are positioned perpendicularly to the sides and also to the rails. The bottom of the housing that holds the horizontal bearings extends to the outside of the side wall with the bearings placed therein with the horizontal bearings extending into the housing past the side wall of the housing.

Vertical bearings are placed and retained within partially circular cutouts in the side walls. The vertical bearings extend higher and lower than the rails and space the rails from the side walls, preventing binding of the rails with the side walls of the housing.

Resilient bearings or detents are used to hold the rails in position on the fixed horizontal bearing under the rails. The resilient bearings press against the rails from the top of the rails. The resilient bearings are held in a block above the rail with the block being attachable to the side wall of the housing. Alternately, the resilient bearings are held by the top plate of the housing with the top plate being extended beyond the side walls and over the rails of the rail assembly.

The rails can be shafts or bars. A bar having a square cross section can be used. A concavity can be formed into the rail to allow any grinding dust or other foreign materials to drop away from the rail. The resilient detents can be added to the rail itself to work against a top surface to force the rail against the fixed horizontal bearing under the rail.

The present invention is a device for moving a dressing (dresser) arm for the dressing of a grinding wheel for the purpose of preparing a grinding wheel for sharpening of an ice skate blade. The device locates and stabilizes the dressing tool for the dressing of the wheel and hence results in the sharpening of the ice skate blade with the desired shape. The device easily is moved into working position without binding.

Essentially, the invention comprises a housing almost completely surrounding the grinding wheel. The housing has a planar plate with sides and a back rising from the plate. A top plate fits to the housing almost encasing the grinding wheel. A segment of the wheel remains exposed for the actual dressing or sharpening. The housing protects the grinding wheel itself and also provides mass to dampen the vibration during the dressing of the wheel and during the sharpening process. The housing also provides some protection to the operator by containing the pieces of the grinding wheel in case the grinding wheel should break apart.

The grinding wheel is mounted on an end of a drive shaft that terminates inside the housing at the grinding wheel. The drive shaft is powered conventionally by a drive motor. A sliding mechanism is movable along the sides of the housing. At the front of the sliding mechanism, the dresser arm is designed to swing into place to position the dressing tool to the grinding wheel.

After the dresser arm swings the dressing tool in front of the grinding wheel, the dressing tool is introduced to the grinding wheel by moving the sliding mechanism so that the grinding tool engages with the grinding wheel. The dresser arm has an adjustment to allow the dresser tool to be placed against the desired point on the edge of the wheel. The adjustment is by an eccentric adjustment wheel at both ends of the dresser arm.

The movable frame comprises rails and/or shafts that slide on bosses on the sides of the housing. Bearings on the bosses and the housing facilitate the movement of the shafts. The rails/shafts connected at the front by the dresser arm and at the back by a cross bar. Blocks are affixed to the housing above the shafts to hold the shafts. Fixed and/or resilient bearings are added to the rails/shafts and to the blocks to allow the movable frame to easily slide into position. The bearings in the rails/shaft can be strip bearings that are placed into longitudinal grooves milled in the shafts. Resilient bearings or detents are also useful to provide resilient holding.

The rails/shafts must be maintained parallel with each other. Holding the rails/shafts apart or spacing the rails/shafts prevents binding of the movable frame. This is accomplished by attaching the ends of the rails/shafts within the yokes or split ends of the dresser arm. The mass of the dresser arm prevents the shafts from narrowing together and binding. The cross bar also is used for adjustably spacing the rails/shafts.

An alternate rails/shaft spreading device is a spacer connected above the housing. The spacer device comprises two bars that each have a vertical part that is joined to the rails/shaft. Each bar angles to a horizontal part over the top of the housing. The ends of the horizontal parts are threaded, one with right hand threads and the other with left hand threads. A connector having reverse threads, that is, one end having left hand thread and the other end having right hand threads, (similar to a turn buckle) is joined to the bars. Adjustment is made by turning the connector to space the rails/shafts apart or closer together. Lock screws secure the bars at the optimum spacing.

It is envisioned that the device can be advantageously employed with a variety of grinding devices, not just for skate grinding devices. An advantage of this device is the dresser tool is easily slid into position. This invention can be used on other types of grinder/sharpeners.

For a more complete understanding of the present invention, reference is made to the following detailed description when read with in conjunction with the accompanying drawings wherein like reference characters refer to like elements throughout the several views, in which:

DESCRIPTION OF THE PREFERRED EMBODIMENTS

Figure 1A:
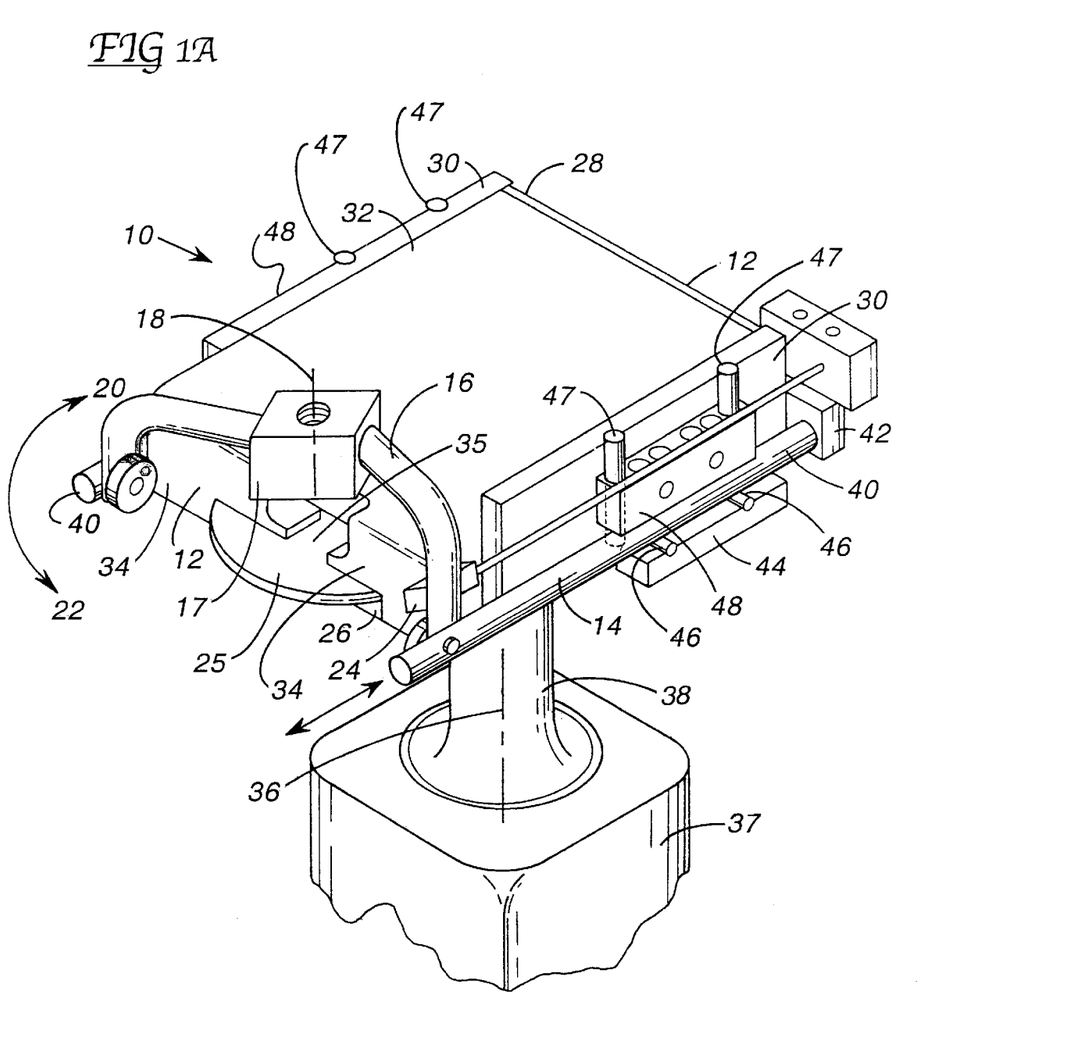
FIG. 1A illustrates a perspective view of the dresser device according to the invention.

In FIG. 1A, a device for slidably moving a pivotable dressing arm having a dressing tool to a dressing position for dressing/shaping a grinding wheel for the sharpening of an ice skate blade, generally denoted as 10 is thereshown. The dressing device 10 comprises a housing 12, a movable frame assembly 14, and a dresser arm 16 having a mounting block 17 for a dressing tool (not shown but indicated by center line 18) attached thereto. The dresser arm 16 is pivotable between a storage position 20 and a dressing position 22. In the storage position 20, the dresser arm 16 is retained by a locking mechanism 24 on rod 23. After the dresser arm 16 is pivoted into the dressing position 22, the dresser arm 16 with the dressing tool 18 is then movable on a horizontal plane via the movable frame assembly 14 into and away from a grinding wheel 25 for a dressing operation. In FIG. 1D, the dressing tool 15 is shown as mounted to the block 17 of the dressing arm 16 along the center line 18. Dressing tool 15 is in the dressing position 22 with the dressing tool 15 almost engaging the grinding wheel 25. To engage the dressing tool 15 with the grinding wheel 25 the dressing arm 16 is moved forward by pushing towards the grinding wheel. Pushing on the dressing arm moves the movable frame assembly 14 along the a left side and a right side of the housing and moves the dressing arm closer to the grinding wheel for controlled engagement of the dressing tool with the grinding wheel.

The housing 12 of the dressing device 10 comprises a planar bottom plate 26, with a back 28 and sides 30, 30 extending perpendicularly therefrom. A top plate or cover 32 with depending front edges 34, 34 fits to the housing 12. The housing has an opening 35 to allow a portion of the grinding wheel 25 near the circumference of the grinding wheel 25 to extend beyond the housing 12. However, most of the grinding wheel 25 is covered by the housing 12.

The grinding wheel 25 is driven by a drive shaft 36 powered by motor (not shown) contained within a motor housing 37. Thus the grinding wheel 25 is rotated to provide the necessary sharpening to an ice skate blade. The drive shaft 36 is enclosed within a pedestal 38, upon which the housing 12 is placed.

Movable frame assembly 14 comprises rails 40, 40 on either side of the housing 12 to which the dresser arm 16 is connected. Rails 40, 40 are also connected at the back of the housing 12 by a cross bar 42.

Rails 40, 40 slide along bosses 44, 44 extending from the housing 12. Rails 40, 40 can be shafts, bars or have other configurations. Bearings 46, 46 can be emplaced to the bosses 44, 44 and to the housing 12 to facilitate the movement of rails 40, 40. Above rails 40, 40, blocks 48, 48 are affixed to opposite sides of the housing 12. Bearings generally indicated as 47 can be added to the sides 30 of housing 12 to fit vertically between block 48 and the side 30. (One side 30 and one rail 40 will be further described herein. However, the description is applicable to the other side 30 and the other rail 40.)

Two or more vertical bearings 47 extend lower than the rail 40 and space rail 40 out from side 30, preventing binding. Block 48 is depicted as a single block but block 48 could be formed in several pieces. One or more horizontal bearings 46 fit under rail 40 while resilient bearings 51 ride on the top of the rail 40. Resilient bearing 51 is generally vertically disposed.

Resilient bearing 51 acts as a detent and can have a resilient coil disposed around the bearing to bias the bearing 49 against the rail 40. Bearings 46, 47 and 51 are generally cylindrical. Bearings 47 are generally disposed vertically while bearings 46 are generally disposed horizontally. Bearings 47 are cylindrical and fit in partially circular cut outs 49 in the housing 12. Bearings 47 extend beneath the block 48 and lower than adjacent shafts 40, 40. Bearings 47 force rails 40, 40 out from the housing 12 and thus prevent binding of rails 40, 40 as the rails slide against the described bearings as the dresser arm 16 is moved forward and backward. Bearings 46, 47 and 51 can be formed from Teflon® material or other material having lubricating properties such as Delrin® material. (Teflon® and Delrin® are registered trademarks of the Dupont Corporation for its proprietary materials.)

Figure 1B:
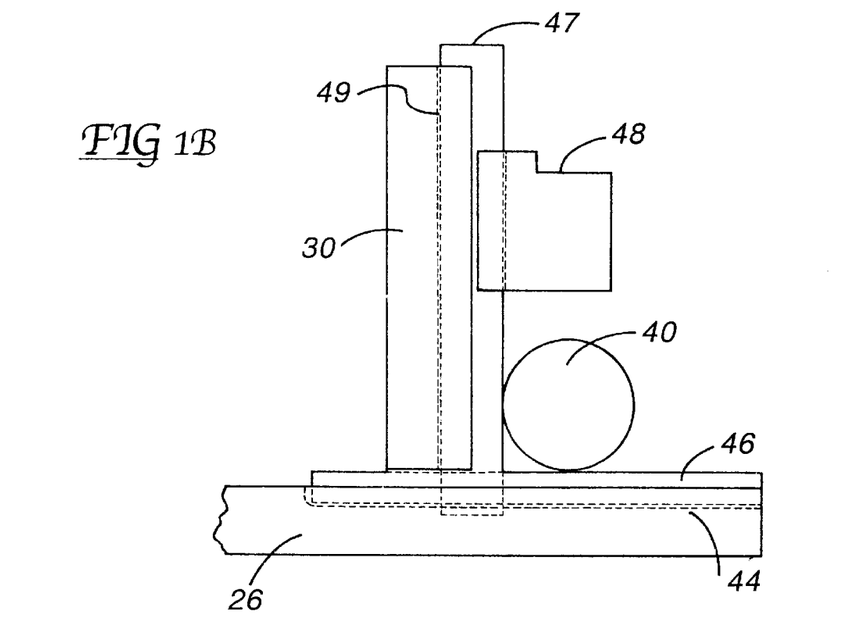
FIG. 1B illustrates a close-up partial front view of the side of the dresser device with the block over the rail and bearings vertical and horizontally disposed to the rail according to the invention.

FIG. 1B is a close-up partial front view showing the circumference of rail 40 with bearing 47 partially recessed into a vertical partially circular cut out 49 in the side 30. Block 48 is mounted to side 30 above rail 40. Bearing 46 is shown horizontally disposed under the rail 40. Bearing 46 is recessed into the boss 44. Boss 44 can be formed as an integral part of bottom plate 26 with bearing 46 extending under side 30 for ease of removal.

Figure 1C:
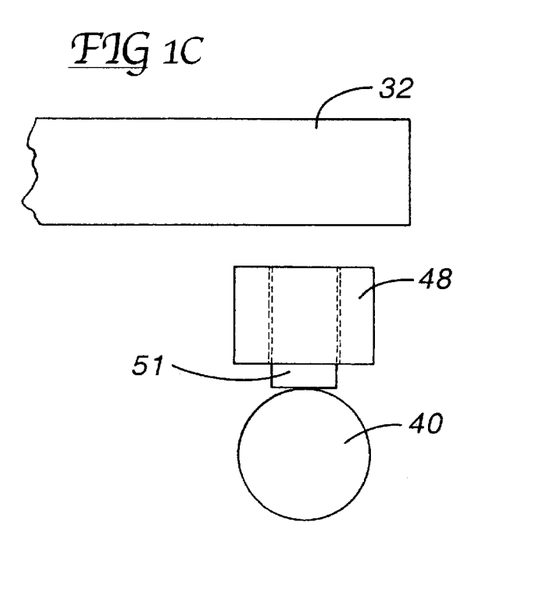
FIG. 1C illustrates a close-up partial front view of a variation of the dresser device with the top plate holding the block over the rail and resiliently biased bearings riding on the top of the rail according to the invention.
Figure 1D:
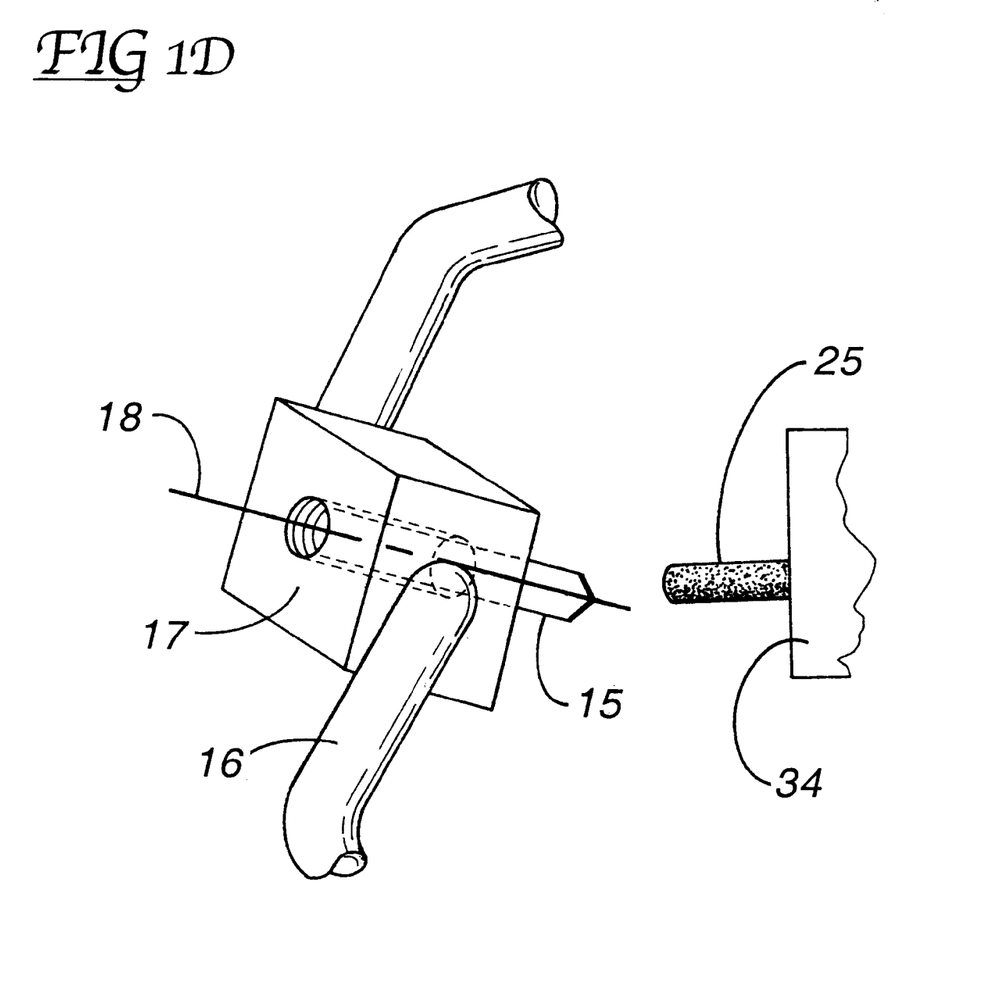
FIG. 1D illustrates the dressing tool of the dressing device near to the dressing position of engagement with a grinding wheel.

FIG. 1C shows a close-up partial front view of a variation whereby the top plate 32 extends over rail 40. Resilient bearing or detent 51 are in block 48. Resilient bearing 51 rides on rail 40. Alternately, resilient bearings 51 or detents can be emplaced in the rail 40 itself to directly engage the top plate 32 (see FIG. 7). One or more resilient bearings 51 can be used advantageously in the block 48.

Figure 2:
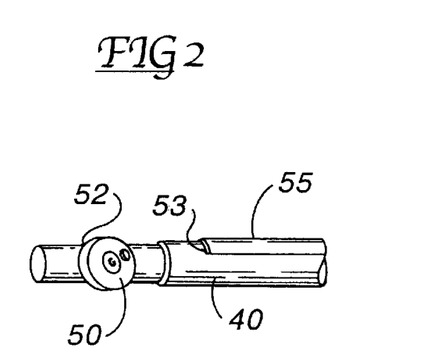
FIG. 2 illustrates a partial side view of the rail showing the adjustment wheel.

Now turning to FIG. 2 thereshown is an adjustment wheel 50 on the front end of the rail 40. Adjustment wheel 50 is also provided on the rail on the opposite side of the housing. Adjustment wheel 50 is fitted into a milled pocket 52 in rail 40. The dresser arm 16 is affixed to the adjustment wheel 50. The adjustment wheel is an eccentric wheel and when turned moves the dresser arm 16 slightly above and below the center of the line through the ends of the shafts. Thusly, is fine adjustment of the dressing tool 18 accomplished. A strip bearing 55, such as brass or Teflon, is shown inserted into a milled slot 53 in rail 40.

Figure 3:
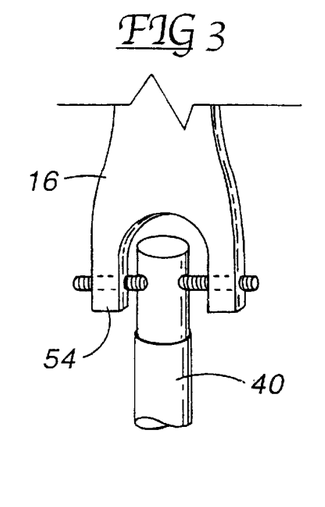
FIG. 3 illustrates a view of an end of the dresser arm showing the yoke.

Spacing apart rails 40, 40 and maintaining the spacing and parallelism of the rails is important to the easy movement of the movable frame assembly 14. Rails 40, 40 need to be spaced properly to limit binding of the movable frame assembly 14. FIG. 3 shows the dresser arm 16 at the front of the device as having a split end or yoke 54 provided at the end into which rail 40 is attached. Another yoke 54 is provided on the other end of the dressing arm on the other rail (not shown). Adjustment is provided within the space of the yoke opening. Rails 40, 40 can come no closer together than the smallest dimension of the yoke 54 openings.

Figure 4:
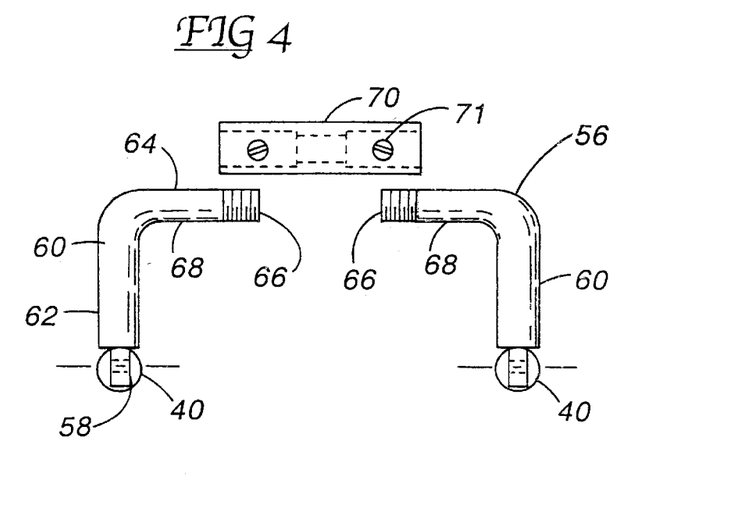
FIG. 4 illustrates a front view of a spacer device for mounting to the rails and connecting the rails above the housing.

An alternate spacing device 56 is depicted in FIG. 4. This spacer device is at the back of the movable frame assembly near the back of the housing 12. Spacer device 56 attaches to rails 40, 40 through slots 58, 58 provided in rails 40, 40 or to a saddle or a clamp around the rails (not shown). The spacer device 56 comprises two arms 60, 60. Arms 60, 60 each have a vertical part 62 that is angled into a horizontal part 64. Threads 66, 66 are worked on the ends 68, 68 of the arms away from rails 40, 40. One arm has right hand threads, while the other arm has left hand threads. A connector 70 spans the gap between the ends 68, 68 of the arms. Connector 70 has threads to match those of the ends of the arms. Connector 70 is turned to draw rails 40, 40 closer together or turned the other way to move rails 40, 40' farther apart. The desired spacing is retained by tightening set screws 71 through the connector 70 to lock the spacing of rails 40, 40.

Figure 5:
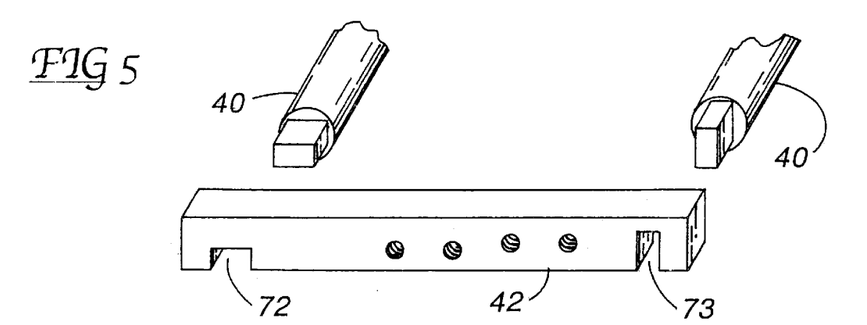
FIG. 5 illustrates a back view showing the means for adjusting on the back of a rail.

Now turning to FIG. 5, a back view of cross bar 42 is thereshown. Cross bar 42 has a longitudinal slot 72 and a notch 73 therethrough. Ends of rails 40, 40 engaging with the cross bar 42 have flats thereon the rails to engage with the slot 72 and the notch 73. Adjustment and alignment of rails 40, 40 can be made here also.

Figure 6:
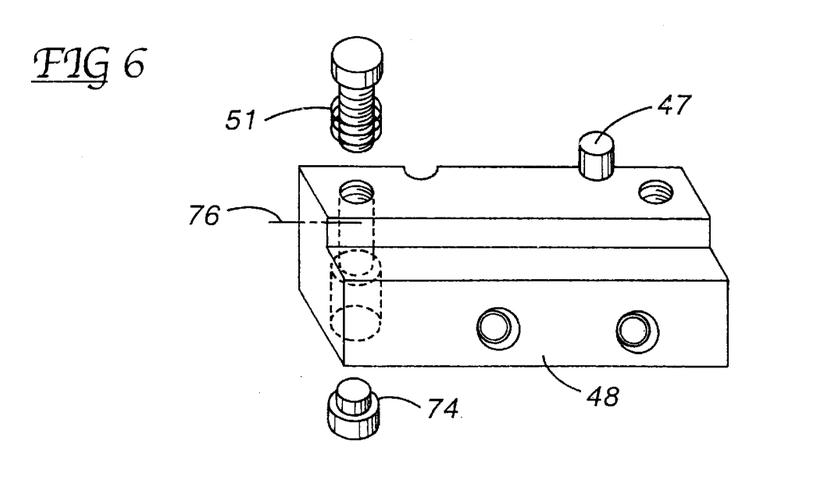
FIG. 6 illustrates a view of the side block.

FIG. 6 depicts a block 48 for holding rail 40 along a side of the housing 12. Each side of the device 12 can employ a block 48, but one block will be described herein. Block 48 is fitted above rail 40 and is affixed to the housing 12. Block 48 can have a semicircular cutout to fit around bearing 47. Resilient bearings 51 can be mounted through block 48 to press down on the top of rail 40 beneath (not shown). Rail 40 easily slides between the block 48 and the boss 44, which can be formed on the housing 12. Bearings 46 can be made from lubricated material such as Teflon or Delrin.

Better shown in FIGS. 1B and 1C, bearings 46, 46 can be mounted in boss 44 to support the under side of rail 40. Resilient bearing 51 or plunger detent can be added to block 48 to ride on the top of rail 40 when block 48 is assembled to side 30. Resilient bearing 51 can hold down a bearing insert 74 on the top of rail 40. Resiliently biased bearing 51 positions a bearing insert 74 to ride on the shaft yet not bind the shaft.

Bearings 47, 47 are also made from a lubricated material such as Teflon or Delrin. Bearings 47, 47 are fittable into semicircular cutout in the block 48 and a corresponding partially circular cutout 49 in the sides 30, 30. The partially circular cutout 49 in the sides 30, 30 is larger than a semicircle and holds the bearing 47 in place.

Bearings 46, 47 and 51 prevent the rail from binding against the housing. Bearings 46, 46 extend under rail 40 while bearings 47, 47 space between rail 40 and the side 30 of the housing, thus preventing binding of rail 40.

A set screw (not shown) having a nylon tip can be inserted on centerline 76 to tighten against the bearing 51 to maintain the position of the bearing.

Figure 7:
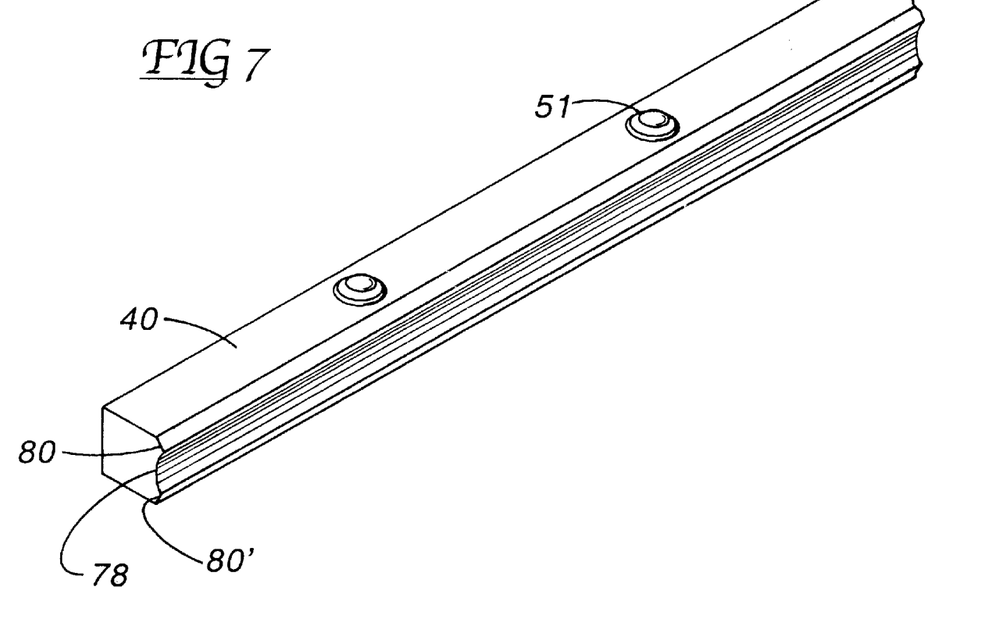
FIG. 7 illustrates a view showing a rail of the rail assembly having resilient bearings in the rail.

FIG. 7 shows rail 40 as having a generally square cross section. One face of rail 40 has a concavity 78 running the entire length of rail 40. Chamfers 80, 80 connect from the concavity 78 to the top and the bottom of rail 40. Resiliently biased bearings 51 or detents are positioned in the rail 40 itself for the resilient bearing to engage directly with the bottom side of the top plate 32 (not shown). Concavity 78 is positioned towards side 30.

Figure 8A:
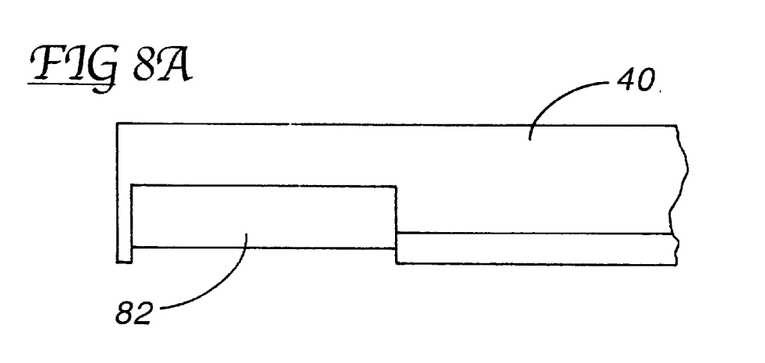
FIG. 8A illustrates a top view showing the means for adjusting on the front end of a rail.
Figure 8B:
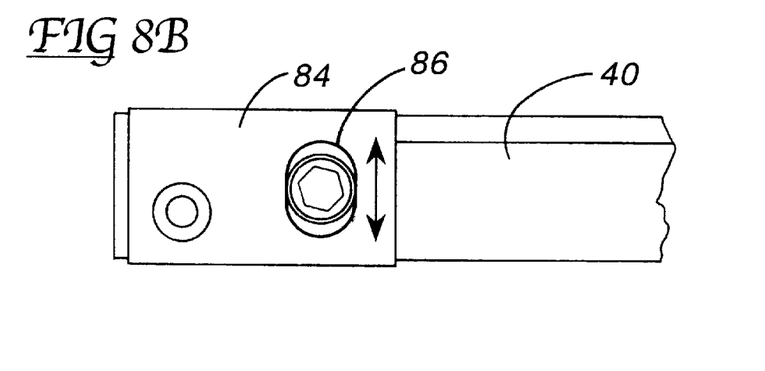
FIG. 8B illustrates a front view showing the means for adjusting on the front of a rail.

FIG. 8A shows a top view of rail 40 with an adjustment slot 82 for adjusting the dresser arm, the adjustment slot 82 being at an end of rail 40 near to the point where the dressing arm 16 (not shown) is attached. FIG. 8B shows a front view of adjustment device 84 shown assembled to rail 40. Adjustment device 84 has an elongated slot 86 for vertical adjustment of rail 40.

Figure 9:
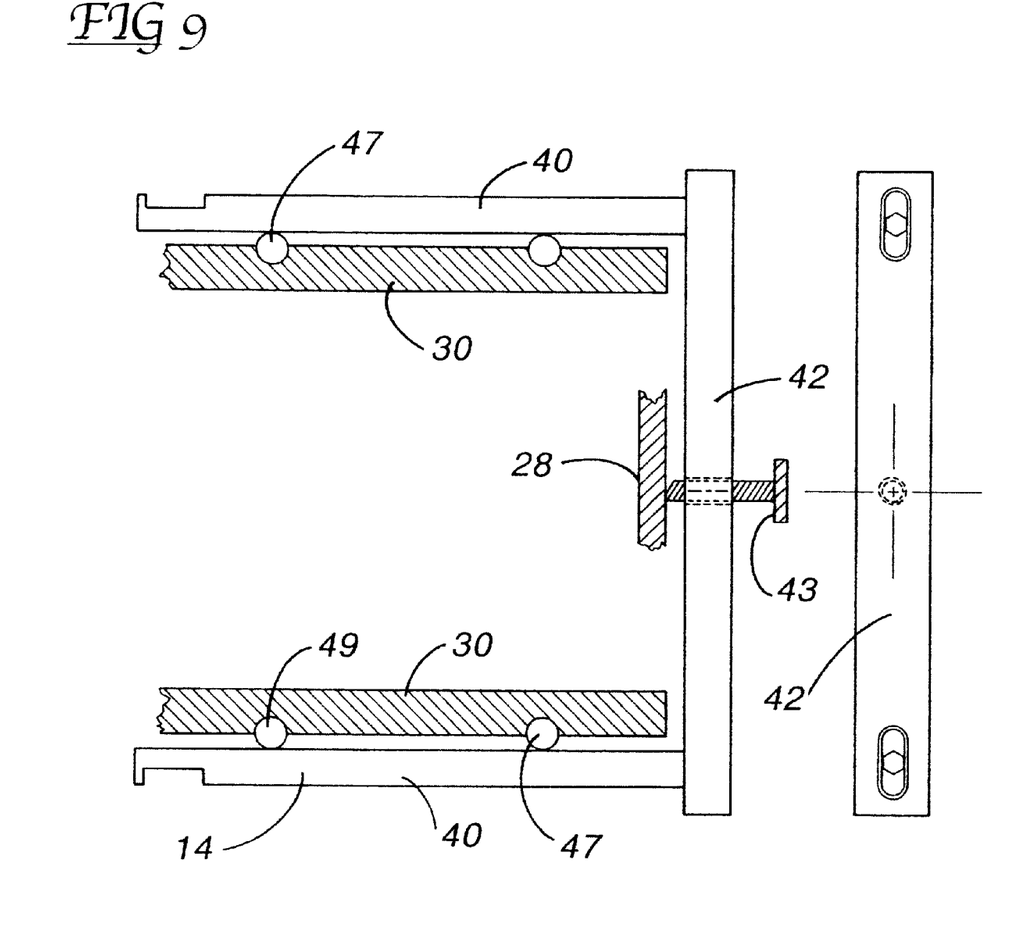
FIG. 9 illustrates a top view showing the means for adjusting with the back of the device with the side of the housing shown in section.

Now turning to FIG. 9, the movable frame assembly 14 is thereshown in a partial top view. Sides 30 and back 28 of the housing 12 are depicted in partial section with bearings 47 in partially circular cut outs 49 in side 30. Rails 40 are connected behind the back 28 of housing 12 by cross bar 42. Means for adjustment 43, hereshown as a threaded handle through the cross bar 42 engages the back 28 of housing 12 and limits the travel of the movable rail assembly 14 in a forward direction.

Having described my invention, many modifications thereto will become apparent to those skilled in the art to which it pertains without deviation from the spirit of the invention as defined in the appended claims.

I claim:

1. A device for moving a pivotable dressing arm having a dressing tool to a dressing position for dressing a grinding wheel for the sharpening of an ice skate blade, the grinding wheel being rotatably mounted on a drive shaft, the grinding wheel being partially contained within a housing comprising a top, a bottom sides and a back, an opening for a portion of the grinding wheel, the device comprising a slidable frame assembly movably connected to the housing, the dressing arm being attached to the slidable frame assembly, the slidable frame assembly being adjustable with relation to the housing, and means for sliding the slidable frame assembly, wherein the means for sliding the slidable frame assembly comprise bearings engaging the slidable frame assembly.

2. The device according to claim 1 wherein the slidable frame assembly comprises movable rails disposed along sides of the housing, the movable rails having ends, the ends of the movable rails being connected by a cross bar across the back of the housing and by the pivotable dressing arm across the front of the housing.

3. The device according to claim 2 wherein the means for sliding the rails of the movable frame comprises vertical bearings between a rail and the housing.

4. The device according to claim 2 wherein the means for sliding the rails of the movable frame assembly comprises horizontal bearings disposed under a rail.

5. The device according to claim 2 wherein the means for sliding the rails of the movable frame assembly comprises a vertical resilient bearing disposed to resiliently bias a rail against a horizontal bearing under the rail.

6. The device according to claim 5 wherein the vertical resilient bearing disposed to resiliently bias a rail against a horizontal bearing under the rail comprises the resilient bearing being in the rail and the resilient bearing pressing against a part of the housing.

7. The device according to claim 5 wherein the vertical resilient bearing disposed to resiliently bias a rail against a horizontal bearing under the rail comprises the resilient bearing being in a part of the housing and the resilient bearing pressing against the rail.

8. The device according to claim 1 further comprising means for adjusting the position of the grinding tool.

9. The device according to claim 8 wherein the means for adjusting the position of the grinding wheel comprises an adjustment wheel.

10. The device according to claim 2 further comprising means for spacing the movable rails.

11. The device according to claim 10 wherein the means for spacing the movable rails comprises at least one yoke on the pivotable dressing arm.

12. The device according to claim 10 wherein the means for spacing the plurality of rails comprises a spacer device between the movable rails.

* * * * *